United States Patent [19]

Reed, Jr. et al.

[11] 4,277,203

[45] Jul. 7, 1981

[54] SOIL STABILIZATION MATERIALS AND METHODS

[75] Inventors: Russell Reed, Jr., Ridgecrest, Calif.; Kenneth L. Moore, Silver Springs, Md.; Gary W. Meyers, Ridgecrest, Calif.

[73] Assignee: The United States of America as represented by the Secretary of the Navy, Washington, D.C.

[21] Appl. No.: 139,077

[22] Filed: Apr. 10, 1980

[51] Int. Cl.$^3$ .............................................. E02D 3/12
[52] U.S. Cl. ..................................... 405/264; 166/295
[58] Field of Search ...................... 166/294, 295, 300; 405/264

[56] References Cited

U.S. PATENT DOCUMENTS

| | | | |
|---|---|---|---|
| 2,867,278 | 1/1959 | Mallory et al. | 166/295 |
| 3,268,002 | 8/1966 | Fischer. | |
| 3,533,470 | 10/1970 | Marsh | 166/300 X |
| 3,705,467 | 12/1972 | McKnight. | |
| 3,727,412 | 4/1973 | Marx et al. | 405/264 |
| 3,763,072 | 10/1973 | Krieger | 260/29.6 S |
| 3,851,479 | 12/1974 | Argabright et al. | 405/264 |
| 3,878,686 | 4/1975 | Hageman et al. | 405/264 |
| 3,953,975 | 5/1976 | Busler et al. | 405/264 |
| 4,028,897 | 6/1977 | Bennett. | |
| 4,040,258 | 8/1977 | Argabright et al. | 166/295 X |

*Primary Examiner*—Stephen J. Novosad
*Assistant Examiner*—George A. Suchfield
*Attorney, Agent, or Firm*—R. S. Sciascia; W. Thom Skeer; Lloyd E. K. Pohl

[57] ABSTRACT

A method for stabilizing the soil wherein a liquid selected from the group consisting of (1) a mixture of dimer diisocyanate and dimer diamine; and (2) a mixture of dimer diisocyanate and a ketimine derivative of dimer diamine is applied to the soil and allowed to polymerize to form an elastomeric resin which bonds the soil particles together to form a composite structure.

5 Claims, No Drawings

SOIL STABILIZATION MATERIALS AND METHODS

BACKGROUND OF THE INVENTION

1. Field of the Invention

This invention relates to soil stabilization.

2. Description of the Prior Art

The prior art discloses many reasons for wishing to stabilize the soil. For example, soil has been stabilized to prevent erosion, to prevent seepage and even to accelerate the rate of seed germination. The military services and others who fly helicopters are interested in stabilizing the soil to prevent dust from being stirred up when a helicopter lands.

Some soil stabilization techniques require the penetration of a stabilizing material deep into the soil. This is true, for example, when it is desired to stabilize soil around a leaking conduit or the like to prevent fluid from leaking out of the conduit. However, most soil stabilization techniques involve the formation of a crust or layer of relatively impervious material on the surface of the soil. These techniques are used to prevent or at least interfere with erosion and are suitable to prevent dust clouds. They differ from each other primarily in what the soil stabilization material is.

Materials used in this latter soil stabilization technique have included natural or synthetic rubber latexes mixed with oil (U.S. Pat. No. 4,028,897); the reaction products of cationic polymer latexes prepared from acrylate polymers and anionic lignins produced by alkali treatment of cellulosic materials (U.S. Pat. No. 3,705,467); mixtures of acrylic emulsion polymer with sodium silicate (U.S. Pat. No. 3,763,072); and aqueous solutions of water soluble salts of polymeric polycarboxylic polyhydroxy acids (U.S. Pat. No. 3,268,002). These aforementioned materials have drawbacks. Among these drawbacks is the fact that they tend to cure slowly. That is, once the material is applied to the soil, it generally takes hours and sometimes days before stabilization is achieved. This tendency toward slow curing is an especially serious drawback when the soil stabilization purpose is dust suppression. In many situations it is desirable to have a helicopter land within minutes or even seconds after the crust-forming materials have been applied. In such situations, the aforementioned materials cure too slowly to be of use. If they have not cured, there is no adhesion of the loose surface of dust, sand, or gravel to the soil beneath so that the dust and sand are easily blown away.

SUMMARY OF THE INVENTION

According to this invention, the process of soil stabilization wherein a liquid is applied to the surface of the soil and then rapidly polymerizes to form an elastomeric resin which bonds the soil particles together to form a tough composite structure is improved. The improvement resides in the provision of a liquid which stablizes the soil within a time span of from a few seconds to an hour, depending upon the composition of the soil stabilizer. The stabilizing materials used in this invention are (1) mixtures of dimer diisocyanate and dimer diamine and (2) mixtures of dimer diisocyanante and a derivative of dimer diamine wherein the amine groups have been reacted with a ketone to form ketimine groups.

DESCRIPTION OF THE PREFERRED EMBODIMENTS

The preferred embodiment of this invention involves the reaction of dimer diisocyanate with either dimer diamine or a ketimine derivative of dimer diamine to form a tough soil composite which is effective in preventing dust from being raised by helicopters or the like. In addition to being useful in dust suppression, the stabilized soil composites formed according to this invention may be used to prevent or hinder water or wind erosion or to prevent or hinder seepage of water.

There are two modes for practicing this invention. Each has advantages which might make it preferred over the other in certain situation. Thus, either might be considered the best mode.

One of the aforementioned modes involves mixing and reacting dimer diisocyanate and dimer diamine. When these two materials are mixed, they react very quickly (within a matter of seconds) to form a tough resin. No catalyst is required and, since both materials use liquids, no solvent is required.

Because dimer diisocyanate and dimer amine react so readily together, their use in the practice of this invention requires that they be kept separate until the actual time for application has arrived. Thus, it is convenient to store them in separate containers and spray them from separate nozzles in a manner whereby the two sprays mix in the air and settle together upon the soil to be stabilized.

If time is not a factor, dimer diisocyanate and dimer diamine may be mixed with toluene or some other suitable solvent prior to their application. When solutions of the two materials are applied to the same area of the soil, the liquids penetrate the surface layer and then react to form the stabilizing resin as the solvent evaporates.

The second embodiment of this invention involves the reaction of dimer diisocyanate and a dimer diamine derivative in which the amine groups have been reacted with methylisobutyl ketone to form a ketimine. The ketimine formation takes place according to the equation:

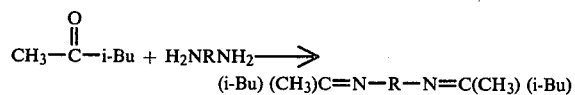

$$CH_3-\overset{O}{\underset{\|}{C}}-i\text{-Bu} + H_2NRNH_2 \longrightarrow$$
$$(i\text{-Bu})(CH_3)C=N-R-N=C(CH_3)(i\text{-Bu})$$

wherein R is the 36 carbon moiety of dimer diamine.

When dimer diisocyanate and the ketimine are used, the two may be mixed in the same container and sprayed from a single nozzle provided spraying is to take place within a reasonable time (approximately three hours or less) after mixture. The two compounds are only mildly reactive with one another under dry conditions. However, once a mixture of the two materials has been deposited on soil that is to be stabilized, reaction and resin formation occurs very quickly. It is theorized that moisture from the soil hydrolyzes the ketimine to the free amine which then reacts rapidly with the isocyanate to produce the resin. Reaction between these two components may be catalyzed by an organic acid such as acetic acid or dimer acid.

When dimer diisocyanate and the ketimine derivative are mixed, they may either be mixed as neat liquids or in the presence of a hydrocarbon solvent such as toluene or the like.

If one does not wish to mix dimer diisocyanate and the ketimine prior to application, mixing is not necessary. The two materials may be stored in separate containers and sprayed from separate nozzles as are dimer diamine and dimer diisocyanate when they are used in practicing the first mode described above.

Which of the two modes described for practicing this invention is the best mode depends upon the nature of the soil, conditions of application and the equipment available. If containers and the space that they take are readily available, the first mode described may be considered the best. On the other hand, if the space that containers take is a problem or if one is going to have difficulty in obtaining containers, the second mode described, which requires only one container, may be considered the best mode.

It may be desired to spray the materials onto the soil from a distance. For example, they may be sprayed from a helicopter. If this is the case, the dimer diisocyanate-ketimine mixture may be superior because the dimer diisocyanate-dimer diamine mixture may react too quickly to allow for suitable soil penetration.

It is preferable to mix the reactants of this invention in stoichiometric amounts to avoid waste. However, an excess of any ingredient is permissible.

The materials used in this invention are non-toxic and the polymers produced are also non-toxic. A further advantage lies in the fact that dimer diisocyanate is non-reactive with moisture. Other diisocyanates are not useful in the practice of this invention because of their reactivity with soil moisture.

The stabilizing resins formed according to this invention are insoluble in water and apparently do not degrade. In test plots, they have been effective for several years with no evidence of degradation. They have low glass transition temperatures and remain pliable in sub-freezing conditions.

What is claimed is:

1. In a method for stabilizing soil wherein a liquid is applied to the soil surface and allowed to polymerize to form an elastomeric resin which bonds the soil particles together to form a composite structure the improvement residing in utilizing as said liquid a mixture of dimer diisocyanate and a derivative of dimer diamine wherein the amine groups have been reacted with a ketone to form ketimine groups.

2. A method according to claim 1 wherein dimer diisocyanate and said derivative of dimer diamine are stored in separate containers prior to being applied and are mixed in the air above the surface of the soil that is to be stabilized.

3. A method according to claim 1 wherein dimer diisocyanate and said derivative of dimer diamine are mixed in a single container prior to being applied.

4. A method according to claim 1 wherein acetic acid is utilized to catalyze the polymerization reaction between dimer diisocyanate and said derivative of dimer diamine.

5. A method according to claim 1 wherein dimer acid is utilized to catalyze the polymerization reaction between dimer diisocyanate and said derivative of dimer diamine.

* * * * *